(12) United States Patent
Park et al.

(10) Patent No.: US 10,072,946 B2
(45) Date of Patent: Sep. 11, 2018

(54) DISPLAY TERMINAL WITH FLIP COVER

(71) Applicant: MagnaChip Semiconductor, Ltd., Cheongju-si (KR)

(72) Inventors: Seung-hwan Park, Cheongju-si (KR); Hyung-nam Jin, Sejong-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 578 days.

(21) Appl. No.: 14/219,790

(22) Filed: Mar. 19, 2014

(65) Prior Publication Data
US 2015/0066423 A1    Mar. 5, 2015

(30) Foreign Application Priority Data
Aug. 29, 2013 (KR) .................. 10-2013-0102846

(51) Int. Cl.
*G01D 5/14* (2006.01)
*H04M 1/02* (2006.01)

(52) U.S. Cl.
CPC .......... *G01D 5/145* (2013.01); *H04M 1/0216* (2013.01); *H04M 1/0245* (2013.01)

(58) Field of Classification Search
CPC ... G01D 5/145; H04M 1/0245; H04M 1/0216
USPC ....... 702/150; 455/575.1, 575.3, 575.4, 566; 713/323; 307/116; 324/251, 226
See application file for complete search history.

(56) References Cited

U.S. PATENT DOCUMENTS

| | | | | |
|---|---|---|---|---|
| 7,633,745 | B2 * | 12/2009 | Sakakibara | G06F 1/1624 312/223.2 |
| 8,019,397 | B2 * | 9/2011 | Cho | H04M 1/0237 455/575.4 |
| 8,165,648 | B2 * | 4/2012 | Higashigawa | H04M 1/0237 16/334 |
| 2007/0293283 | A1 * | 12/2007 | Inubushi | H04M 1/0237 455/575.1 |
| 2008/0182634 | A1 * | 7/2008 | Cho | H04M 1/0237 455/575.4 |
| 2009/0045807 | A1 * | 2/2009 | Nishida | G01D 5/145 324/207.2 |
| 2010/0052660 | A1 * | 3/2010 | Wang | H04M 1/0235 324/207.2 |
| 2010/0248796 | A1 * | 9/2010 | Higashigawa | H04M 1/0237 455/575.4 |
| 2010/0298032 | A1 * | 11/2010 | Lee | G06F 1/1616 455/566 |
| 2014/0181700 | A1 * | 6/2014 | Kim | G06F 3/0486 715/761 |
| 2014/0298062 | A1 * | 10/2014 | Lee | G01R 33/07 713/323 |
| 2015/0097558 | A1 * | 4/2015 | Jin | H04B 1/3888 324/226 |

(Continued)

FOREIGN PATENT DOCUMENTS

KR    20-0167871    2/2000

*Primary Examiner* — John Breene
*Assistant Examiner* — Jeffrey C Morgan
(74) *Attorney, Agent, or Firm* — NSIP Law

(57) ABSTRACT

A display terminal includes a first body having a Hall sensor and a second body having a magnetic element. The area of the magnetic element may correspond to a maximum horizontal moving distance and a maximum vertical moving distance of the second body.

11 Claims, 6 Drawing Sheets

(56) References Cited

U.S. PATENT DOCUMENTS

2015/0115943 A1* 4/2015 Jin ..................... H04M 1/0245
324/226

* cited by examiner

DESCRIPTION (a)     (b)

DISPLAY TERMINAL WITH FLIP COVER

CROSS-REFERENCE TO RELATED APPLICATIONS

This application claims the benefit under 35 USC 119(a) of Korean Patent Application No. 10-2013-0102846 filed on Aug. 29, 2013, in the Korean Intellectual Property Office, the entire disclosure of which is incorporated herein by reference for all purposes.

BACKGROUND

1. Field

The following description relates to a display terminal with a flip cover determining an inner magnetic element area by a sliding of the flip cover.

2. Description of Related Art

The Korean Utility Model Registration No. 20-0167871 describes a device of sensing whether a flip cover of a flip-type cordless phone opens or closes including a PCB (Printed Circuit Board), a magnetic sensor and a flip cover. The PCB is installed inside of a body and is accessed through a selection button.

Typically, the use of a Hall element to detect whether a flip cover opens or closes is employed but neither a sensing mechanism nor a magnetic element area is employed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device includes a first body comprising a Hall sensor, a second body comprising a magnetic element having a minimum area, wherein the minimum area of the magnetic element corresponds to at least a maximum horizontal moving distance and a maximum vertical moving distance of the second body.

The device may be a display terminal, the area of the Hall sensor may be L*M, and the minimum area of the magnetic element may be LXmax*LYmax, wherein L denotes a horizontal length of the Hall sensor, M denotes a vertical length of the Hall sensor, LXmax denotes a maximum horizontal moving distance of the second body, and LYmax denotes a maximum vertical moving distance of the second body.

LXmax and LYmax may be respectively obtained based on a total value of a straight line moving distance and a rotational moving distance of the second body.

LXmax and LYmax may be respectively obtained further based on a horizontal or vertical length of the Hall sensor.

LXmax may determined by the following: LXmax=Max (A, Xc, Xd)+L+B, wherein A denotes a left horizontal sliding distance of the second body, B denotes a right horizontal sliding distance of the second body, Xc denotes a horizontal sliding distance by a clockwise rotation of the second body, Xd denotes a horizontal sliding distance by an anticlockwise rotation of the second body, and MAX(A, Xc, Xd) denotes a maximum value among A, X and Xd.

LYmax may be determined by the following: LYmax=Yc+M+Yd, wherein Yc denotes a vertical sliding distance by a clockwise rotation of the second body, and Yd denotes a vertical sliding distance by an anticlockwise rotation of the second body.

The horizontal sliding distance in a clockwise or anti-clockwise rotation of the second body may be determined by the following: $Xc=\sin(\theta/2)*(\sin(\theta/2)*R*2)$; $Xd=\sin(\theta'/2)*(\sin(\theta'/2)*R*2)$, wherein $\theta$ denotes a clockwise rotation angle of the second body, $\theta'$ denotes an anticlockwise rotation angle of the second body, and R denotes a rotation radius of the second body.

A distance of a vertical rotation sliding resulting from the clockwise or anticlockwise rotation of the second body may be determined by the following: $Yc=\cos(\theta/2)*(\sin(\theta/2)*R*2)$, $Yd=\cos(\theta'/2)*(\sin(\theta'/2)*R*2)$, wherein Y denotes the distance of a vertical rotation sliding of the second body, $\theta$ denotes a clockwise rotation angle of the second body, $\theta'$ denotes an anticlockwise rotation angle of the second body, and R denotes a rotation radius of the second body.

A minimum length and width of the magnetic element may be larger than a length and width of the Hall sensor.

The magnetic element may have a rectangular shape.

The magnetic element may be arranged so that an area of the magnetic element is not overlapped by an opposed area of the Hall sensor.

In another general aspect, a device includes a first body, a Hall sensor arranged in the first body, a second body having a maximum sliding area, and a magnetic element arranged in the second body and covering the maximum sliding area.

The device may be a display terminal, the Hall sensor may be configured to sense a magnetic field, and the second body may be connected to the first body.

The maximum sliding area may be calculated based on a horizontal sliding distance and a rotational sliding distance.

The horizontal sliding distance may be calculated using a horizontal sliding distance of the second body.

The rotational sliding distance may be calculated using a clockwise or anticlockwise rotation radius and a rotation angle of the second body.

The rotational sliding distance may be divided into a horizontal rotational sliding distance and a vertical rotational sliding distance.

A horizontal length of the maximum sliding area may be calculated based on a maximum value of the horizontal rotational sliding distance and the vertical rotational sliding distance.

A vertical length of the maximum sliding area may be calculated based on all of the vertical rotational sliding distances for the clockwise and anticlockwise rotations.

The magnetic element may cover an area of the Hall sensor in response to the display terminal being closed.

The horizontal length of the maximum sliding area may be calculated further based on a horizontal length of the Hall sensor.

The vertical length of the maximum sliding area may be calculated further based on a vertical length of the Hall sensor.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
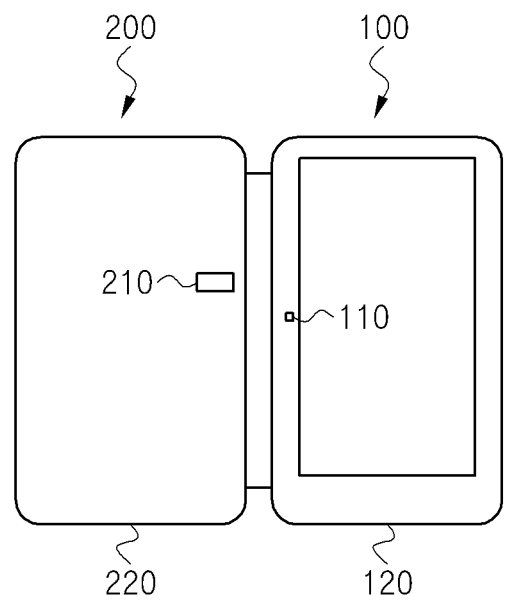
FIG. 1 is a diagram illustrating an example of a display terminal and a flip cover.

FIG. 1 is a diagram illustrating an example of a display terminal and a flip cover or protective cover.

Referring to FIG. 1, a display terminal 100 includes a main body 120 corresponding to a first body and a Hall sensor 110 that is arranged in the main body 120. A flip cover (or protective cover) 200 corresponds to a second body and includes a magnetic element 210 and a covering unit 220. The display terminal 100 and the flip cover 200 are only named after their functions and in other examples, the display terminal 100 and the flip cover 200 may be integrally implemented. For example, the flip cover 200 may be directly coupled to the display terminal 100 or to a backside battery cover.

The display terminal 100 may correspond to a device including a display function. For example, the display terminal 100 includes a device for wireless communication such as a cellphone, a smartphone, a tablet or a two-way radio. The display terminal 100 may include a Hall sensor 110 and a main body 120.

The Hall sensor 110 may sense a magnetic field being generated by the magnetic element 210 of the flip cover 200. The Hall sensor 110 may be integrated into a Hall sensor chip. For example, a Hall sensor chip includes a plurality of Hall elements, a logic circuit, and a memory. The Hall sensor and the Hall sensor chip may be used without distinction and this non-distinction should not limit a claim scope.

The Hall sensor 110 may be implemented as a rectangle and may include one or more Hall elements inside of the Hall sensor 110. The Hall elements may be symmetrically spaced apart from each other at a corner of the Hall sensor 110. The Hall sensor 110 may cover an area larger than a Hall sensor being implemented as a single Hall element. Accordingly, the Hall sensor 110 may sense magnetic field at a larger capacity than a Hall element being implemented as a single Hall element.

It should be appreciated that the Hall element uses the Hall Effect to measure a direction and a magnitude of the magnetic field. The Hall Effect is the production of a voltage difference (the Hall voltage) across an electrical conductor, transverse to an electric current in the conductor and a magnetic field perpendicular to the current. The Hall voltage is proportional to an amount of the electric current and the magnetic field, and when the amount of the electric current is constant, the Hall voltage is proportional to the magnetic field.

The main body 120 may include a display device and a wireless transceiver for wireless communication.

The flip cover 200 may correspond to a device for protecting a display and appearance of the display terminal 100 and may protect the display terminal 100 from scratches or damages resulting from dropping. The flip cover 200 may include a magnetic element 210 for generating a magnetic field and a covering unit 220 for covering a front of the display terminal 100. The opening or closing of the flip cover 200 may generate a variation of the magnetic field surrounding the magnetic element 210 and such variation in the magnetic field may be detected by the Hall sensor 110 of the display terminal 100.

The magnetic element 210 may generate a magnetic field around the Hall sensor 110. The magnetic element 210 is attached to the covering unit 220 and moves according to a movement of the covering unit 220. Accordingly, the magnetic field surrounding the Hall sensor 110 changes according to the movement of the covering unit 220.

The covering unit 220 may protect a front of the display terminal 100 and may internally or externally include the magnetic element 210. A moving distance of the covering unit 220 may vary in an up, down, left or right direction according to a user's style of using the device or decrepitude of the flip cover 200. A movement of the covering unit 220 in an up, down, left or right direction may affect a moving direction and a moving distance of the magnetic element 210 being connected with the covering unit 220. When a variation for the moving distance of the magnetic element 210 is generated, a magnetic field being sensed by the Hall sensor may be changed.

Figure 2:
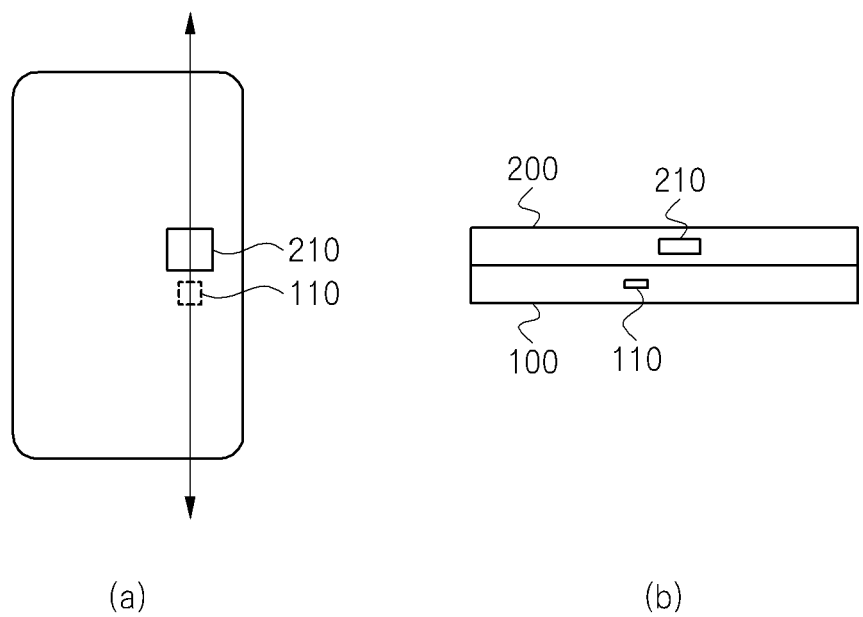
FIGS. 2a and 2b are diagrams illustrating an example of closing a flip cover.

FIG. 2 is diagram illustrating an example of closing a flip cover.

Referring to FIG. 2, when a display terminal 100 covers a flip cover 200, the magnetic element 210 may be arranged closely to the Hall sensor 110.

In an example, when the display terminal 100 covers a flip cover 200, the magnetic element 210 may be arranged at a position which does not overlapped the Hall sensor 110. When the magnetic element 210 is arranged at such position, the magnetic field sensed by each of the one or more Hall elements inside the Hall sensor 110 may respectively be different and the difference of the magnetic field sensed from each of the one or more Hall elements may increase the accuracy of sensing the movement of the flip cover. The magnetic field being sensed by the Hall sensor 110 may be determined according to a distance between each of the one or more Hall elements in the Hall sensor 110 and the magnetic element 210.

A Hall sensor 110 may distinguish a flip cover type based on a magnetic field. When a display terminal is folded and the magnetic element 210 overlaps the Hall sensor 110, the Hall sensor 110 may incorrectly sense the flip cover type because the magnetic field is not distinguished by each of the one or more Hall elements arranged in the corners of the Hall sensor 100. This may cause a problem because the one or more Hall elements in the Hall sensor 110 may be substantially the same as a single Hall element.

In an example, the magnetic element 210 may be closely arranged on one side of an up, down, left or right side of opposed Hall sensor area. In another example, the magnet may be closely arranged in at least one corner of the opposed Hall sensor area.

Figure 3:
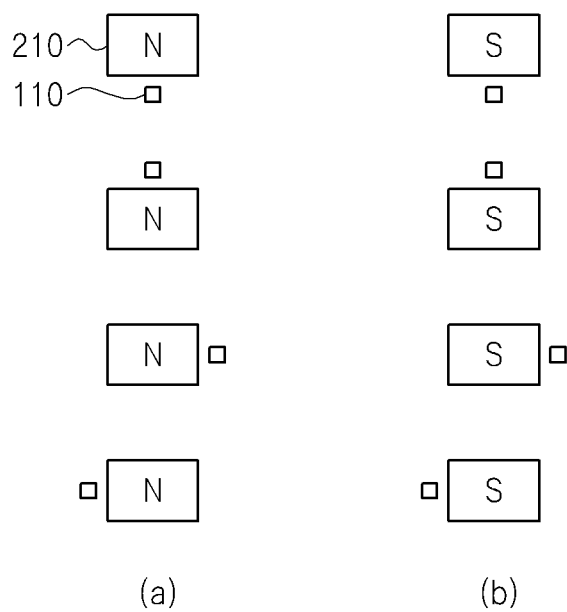
FIGS. 3a and 3b are diagrams illustrating an example of a magnetic element position and a relational position of a Hall sensor.

FIG. 3 is a diagram illustrating an example of magnet positions and a relational position of a Hall sensor.

FIG. 3 illustrates an example where the magnetic element (magnet) 210 may be closely arranged in an up, down, left or right side of an opposed Hall sensor area. In FIG. 3, a N-pole or S-pole of the magnetic element 210 may be closely arranged to the Hall sensor 110. FIG. 3a illustrates an example where the N-pole of the magnetic element 210 is closely arranged in the up, down, left or right side of the opposing area and FIG. 3b illustrates an example where the S-pole of the magnetic element 210 is closely arranged in the up, down, left or right side of the opposing area.

Figure 4:
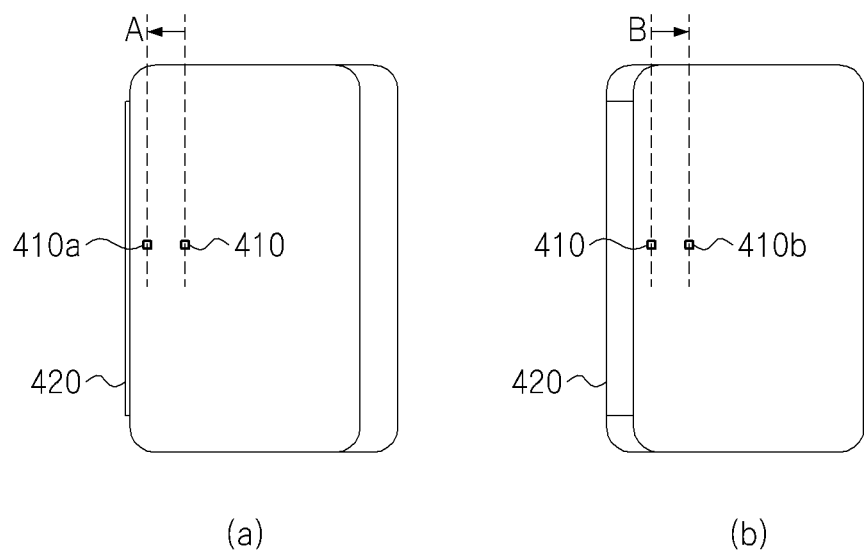
FIGS. 4a and 4b are diagrams illustrating an example of a horizontal sliding of a flip cover.

FIG. 4 is a diagram illustrating an example of horizontal sliding of a flip cover.

Left or right horizontal sliding may be generated in the flip cover 200. The horizontal sliding may be generated due to a hinge 420 for moving the flip cover 200 or may result from decrepitude of the flip cover 200.

Referring to FIG. 4a, a left sliding by a distance A may be generated in the flip cover 200. The left sliding may change a position of the opposed Hall sensor area (e.g., changing the position of the opposed Hall sensor area from 410 to 410a).

Referring to FIG. 4b, a right sliding by a distance B may be generated in the flip cover 200. This may change the position of the opposed Hall sensor area from 410 to 410b and change a position of the opposed Hall sensor area.

Figure 5:
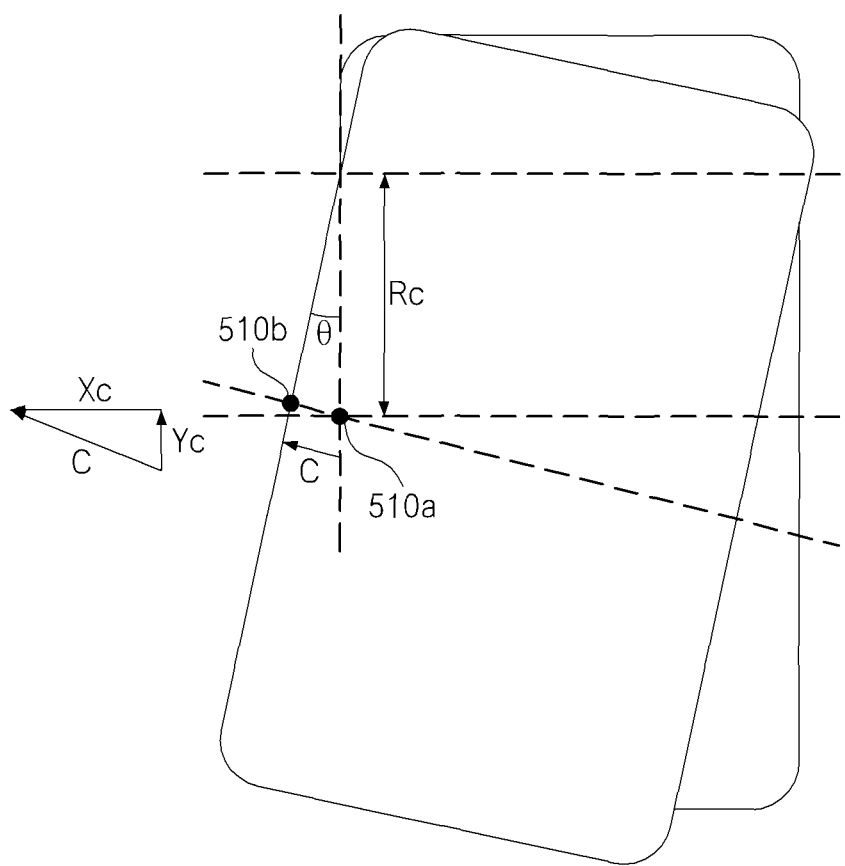
FIG. 5 is a diagram illustrating an example of a clockwise rotational sliding of a flip cover.

FIG. 5 is a diagram illustrating an example of clockwise rotational sliding of a flip cover 200.

Referring to FIG. 5, a clockwise rotational sliding of the flip cover 200 may be generated. The rotational sliding may be generated by a hinge 420 for moving the flip cover 200 or by decrepitude of the flip cover 200.

The flip cover 200 may generate a rotation angle θ in a clockwise direction. A rotation radius (Rc) may correspond to a distance between a starting point at the top of the hinge 420 and the opposed Hall sensor area. The corresponding rotation sliding may change a position of the opposed Hall sensor area by C (e.g., changing the position of the opposed Hall sensor area from 510a to 510b). The X or Y axis components of the moving distance C and the Cartesian coordinate system of C may be determined by the following Mathematical Equation 1.

$$C = \sin(\theta/2) * Rc * 2$$

$$Xc = \sin(\theta/2) * C$$

$$Yc = \cos(\theta/2) * C \quad \text{[Mathematical Equation 1]}$$

C: a rotation sliding distance
θ: a rotation angle
Rc: a rotation radius
Xc: X-axis component of C
Yc: Y-axis component of C FIG. 6 is a diagram illustrating an example of anticlockwise rotational sliding of a flip cover.

Figure 6:
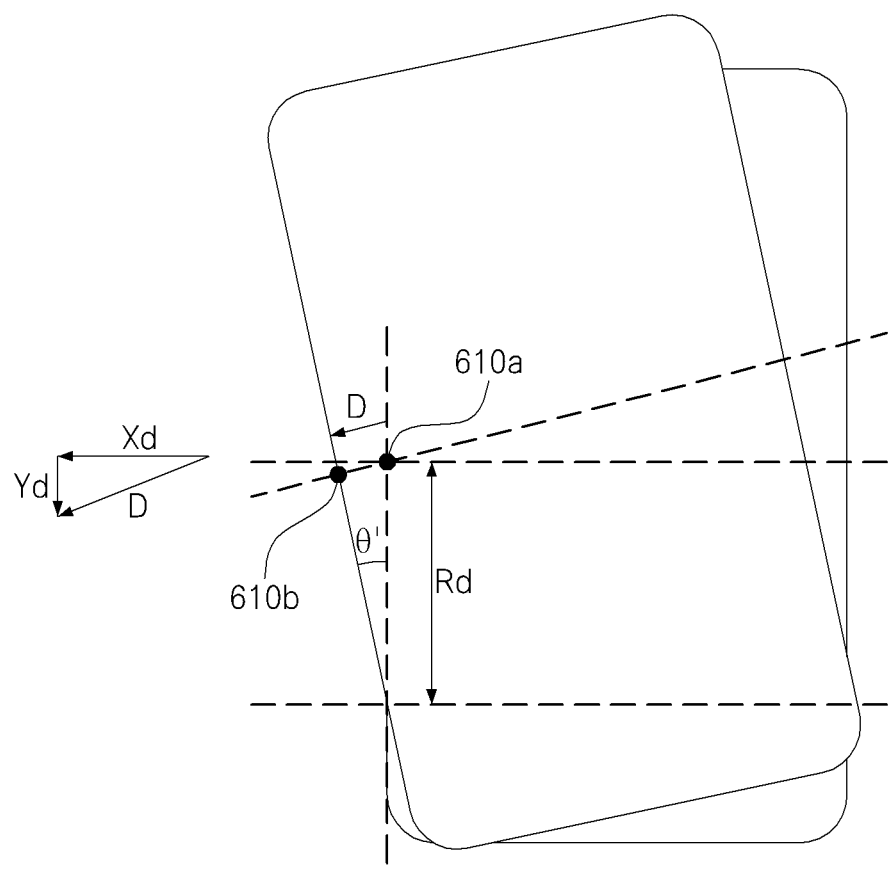
FIG. 6 is a diagram illustrating an example of an anti-clockwise rotational sliding of a flip cover.

Referring to FIG. 6, an anticlockwise rotational sliding may be generated in the flip cover 200. The rotational sliding may be generated by a hinge 420 for moving the flip cover 200 or may result from decrepitude of the flip cover 200. The flip cover 200 may generate a rotation angle θ' in an anticlockwise direction. The rotation radius (Rd) may correspond to a distance between the starting point at the bottom of the hinge 420 and the opposed Hall sensor area. The corresponding rotation sliding may change the position of the opposed Hall sensor area by D (e.g., changing the position of the opposed Hall sensor area from 610a to 610b). The X or Y axis components of the moving distance D and the Cartesian coordinate system of D may be determined by the following Mathematical Equation 2.

$$D = \sin(\theta'/2) * Rc * 2$$

$$Xd = \sin(\theta'/2) * C$$

$$Yd = \cos(\theta'/2) * C \quad \text{[Mathematical Equation 2]}$$

D: a rotation sliding distance
θ': a rotation angle
Rd: a rotation radius
Xd: X-axis component of D
Yd: Y-axis component of D When the clockwise or anticlockwise rotational sliding is generated in the flip cover 200, a rotation sliding distance may be uniformly determined by the following Mathematical Equation 3.

$$X = \sin(\theta/2) * (\sin(\theta/2) * R * 2)$$

$$Y = \cos(\theta/2) * (\sin(\theta/2) * R * 2) \quad \text{[Mathematical Equation 3]}$$

Figure 7:
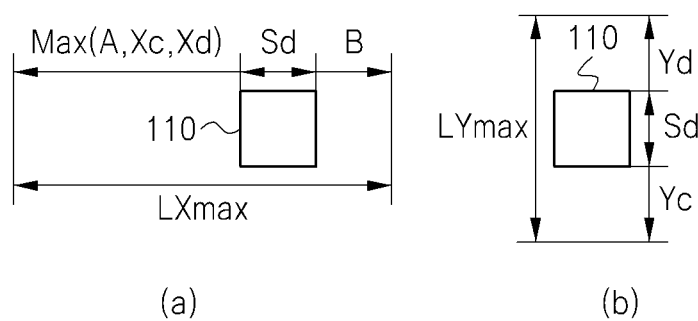
FIGS. 7a and 7b are diagrams illustrating an example of a maximum moving distance of a magnet based on a Hall sensor area.

X: a horizontal rotation sliding distance (a rotation sliding distance in a first direction)
Y: a vertical rotation sliding distance (a rotation sliding distance in a second direction)
θ: a rotation angle
R: a rotation radius FIG. 7 is a diagram illustrating an example of a maximum moving distance of a magnet based on a Hall sensor area.

In this example, assuming that the Hall sensor 110 is implemented as a rectangle, a horizontal and vertical length of the Hall sensor 110 respectively corresponds to L and M. Therefore, an area of the Hall sensor 110 (or the sensor chip) may correspond to an area of L*M.

In FIG. 7a, the magnetic element 210 may be moved to a left or a right direction by a horizontal sliding or a rotation sliding of the flip cover 200. The magnetic element 210 may be moved by a maximum value range of A, Xc, or Xd in the left direction and may be moved by a value of B in the right direction (A: a left horizontal sliding distance, B: a right horizontal sliding distance, Xc: a horizontal sliding distance by the clockwise rotation, and Xd: an X-axis sliding distance by the anticlockwise rotation).

When the magnetic element 210 is closely arranged at an up or down direction of the Hall sensor 110, a maximum moving distance of the magnetic element 210 may be determined by the following Mathematical Equation 4.

$$LX\text{max} = \text{Max}(A, Xc, Xd) + L + B \quad \text{[Mathematical Equation 4]}$$

LXmax: a maximum horizontal moving distance of the magnet.
L: a horizontal length of the Hall sensor
A: a left horizontal sliding distance
B: a right horizontal sliding distance
Xc: a horizontal sliding distance by a clockwise rotation Xd: a horizontal sliding distance by a anticlockwise rotation Max (A, Xc, Xd): a maximum value among A, Xc and Xd values As illustrated in Mathematical Equation 4, a maximum horizontal moving distance LXmax may be obtained based on the horizontal sliding distance and the rotational sliding distance. For example, a horizontal moving distance may be generated due to an X-axis direction movement of the magnetic element 210. The horizontal sliding distance A or B is calculated from a horizontal sliding distance of the second body (i.e., the flip cover). As illustrated in Mathematical Equations 1 through 3, the rotational sliding distance Xc or Xd may be calculated from the rotation radius R and the rotation angle θ or θ'. Herein, Xc represents a horizontal rotational sliding distance resulting from the clockwise rotation and Xd represents a horizontal rotational sliding distance resulting from the anticlockwise rotation. Xc and Xd may correspond to a horizontal component of a rotation being obtained through vector resolution.

The maximum horizontal moving distance LXmax is calculated based on a maximum value of the horizontal sliding distance A, the horizontal rotational sliding distance Xc and the horizontal rotational sliding distance Xd. In an example, the horizontal sliding distance A may be selected when the horizontal sliding is left directed. However, in another example, the horizontal sliding distance B may be selected when the horizontal sliding is right directed. The maximum moving distance LXmax further considers the horizontal length of the Hall sensor L because the magnetic element 210 should cover the Hall sensor 110.

Referring to FIG. 7b, the magnetic element 210 may move in an up or down direction resulting from the rotational sliding. The magnetic element 210 may move in the up direction by a range Yd and may move in the down direction by a range Yc (Yc: a Y-axis sliding distance by the clockwise rotation and Yd: a Y-axis sliding distance by the anticlockwise rotation).

Therefore, when the magnet is closely arranged at a left or right direction of the Hall sensor 110, a maximum moving distance of the magnetic element 210 may be determined by the following Mathematical Equation 5.

$$LYmax=Yc+M+Yd$$ [Mathematical Equation 5]

LYmax: a maximum vertical moving distance of the magnet

M: a vertical distance of the Hall sensor

Yc: a vertical sliding distance by a clockwise rotation

Yd: a vertical sliding distance by a anticlockwise rotation

As illustrated in Mathematical Equation 5, the maximum vertical moving distance of the magnetic element 210 may be calculated from the vertical length of the Hall sensor 110 and the vertical rotational sliding distance of the Hall sensor 110 Yc or Yd. The horizontal sliding distance may be calculated from the horizontal sliding distance of the second body (or the flip cover 200). As illustrated in Mathematical Equations 1 through 3, the rotational sliding distance Yc or Yd may be calculated from the rotation radius R and the rotation angle θ or θ'. Yc represents a vertical rotational sliding distance by the clockwise rotation and Yd represents a vertical rotational sliding distance by the anticlockwise rotation. Yc and Yd may correspond to a vertical component of a rotation as obtained by a vector resolution.

Therefore, the maximum vertical moving distance LYmax is calculated based on all of the vertical rotational sliding distance Yc resulting from the clockwise rotation and the vertical rotational sliding distance Yd resulting from the anticlockwise rotation. The maximum vertical moving distance LYmax further considers the vertical length of the Hall sensor M because the magnetic element 210 should cover the Hall sensor 110.

A value multiplying the maximum horizontal moving distance LXmax and the maximum vertical sliding distance LYmax as calculated by Mathematical Equations 4 and 5, LXmax*LYmax, may correspond to a maximum moving area or a maximum sliding area. The magnet area is larger than the maximum sliding area. That is, the maximum sliding area corresponds to a minimum area of the magnetic element 210. LXmax corresponds to the horizontal length of the maximum sliding area and LYmax corresponds to the vertical length of the maximum sliding area.

Figure 8:
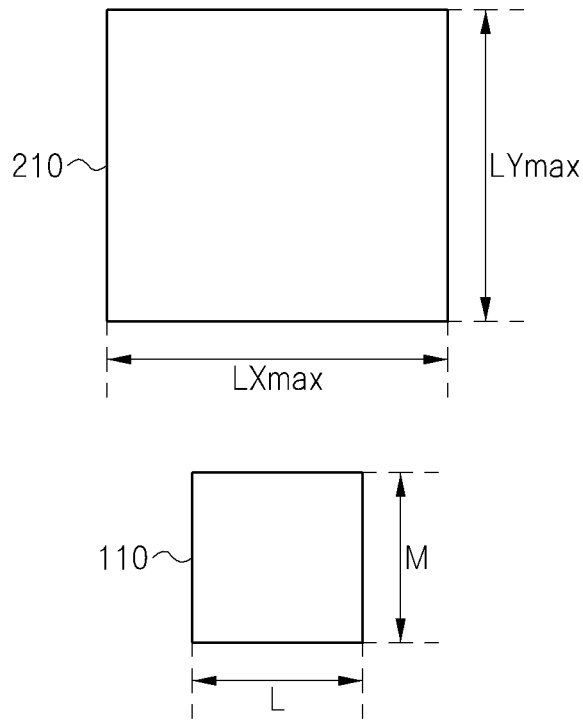
FIG. 8 is a diagram illustrating an example of a minimum area of a magnetic element.

FIG. 8 is a diagram illustrating an example of a minimum area of a magnet.

When the flip cover 200 does not move to the left or right direction, the minimum area of the magnetic element 210 corresponds to the Hall sensor area. In this case, the values of Xc, Xd, Yc and Yd are 0 as illustrated by the Mathematical Equations. For example, assuming that the magnetic element 210 is implemented as a rectangle, a horizontal and a vertical minimum length of the magnetic element 210 is larger than LXmax and LYmax. Therefore, a minimum area of the magnetic element 210 corresponds to LXmax*LYmax. This is in consideration of the left, right, up and down moving distance.

In order for the magnetic field received by the Hall sensor 110 to be varied within a predetermined range in spite of a horizontal sliding of the magnetic element 210, the minimum horizontal length of the magnetic element 210 may be determined as the maximum horizontal moving distance LXmax.

In order for the magnetic field received by the Hall sensor 110 to be varied within a predetermined range in spite of a vertical sliding of the magnetic element 210, the minimum vertical length of the magnetic element 210 may be determined as the maximum vertical moving distance of the magnetic element 210 LYmax.

When the magnet area correspond to LXmax*LYmax as a minimum area, the potential of a sensing error resulting from flip cover movement by sliding may be minimized.

When the magnetic element 210 is overlapped by the Hall sensor 110 during the up, down, left or right sliding or rotation, the potential of a sensing error resulting from flip cover movement by sliding may be minimized. When the magnetic element 210 and the Hall sensor 110 are far away without a predetermined range of the rotational sliding or the horizontal sliding, the Hall sensor 110 inaccurately senses the magnetic field. Therefore, when the horizontal and vertical lengths of the magnetic element 210 correspond to the minimum horizontal and vertical lengths as illustrated in Mathematical Equations 4 and 5, the magnetic field being sensed by the Hall sensor 110 is not decreased. Also, the smaller the area of the magnetic element 210, the more the magnetic field being sensed by the Hall sensor 110 is weak.

Figure 9:
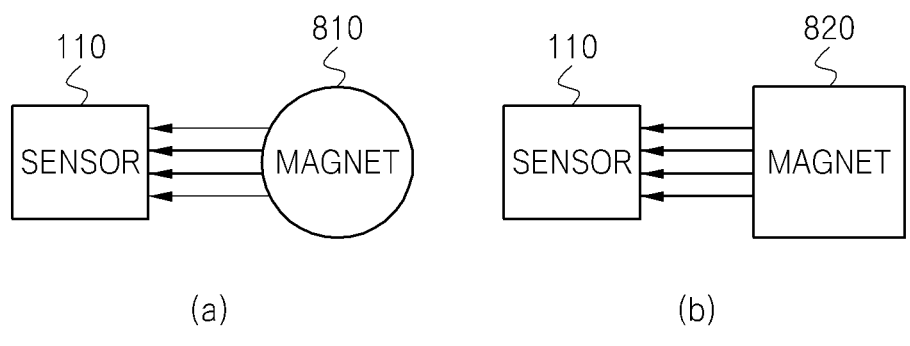
FIGS. 9a and 9b are diagrams illustrating an example of a magnetic field according to a magnetic element or magnet shape.

FIG. 9 is a diagram illustrating an example of a magnetic field according to a magnet shape.

Referring to FIG. 9a, when a circular magnet 910 is closely arranged with the Hall sensor 110, the circular magnet 910 provides a respectively different magnetic field to the Hall sensor 110. For example, the magnetic field may range in magnitude and direction throughout the length and width of the Hall sensor 110.

Referring to FIG. 9b, when a rectangular magnet 920 is closely arranged with the Hall sensor 110, the rectangular magnet 920 may provide a similar magnetic field to the Hall sensor 110. Therefore, when a rectangular magnet 920 is closely arranged with the Hall sensor 110, the magnetic field being sensed by the one or more Hall elements being arranged at a same distance apart from the magnetic element 210 may be varied according to a predetermined range. The display terminal 100 may compare the magnetic field being collected by the one or more Hall elements which are arranged at the same distance apart from the rectangular magnet 920.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device, comprising:
a first body comprising a Hall sensor, the Hall sensor comprising a plurality of Hall elements disposed symmetrically and spaced apart from each other; and
a second body comprising a magnetic element, the second body being configured to overlap with the first body;
wherein the second body is configured to translate a maximum horizontal moving distance (LXmax) relative to the first body along a first axis of an overlapping region of the first body and a maximum vertical moving distance (LYmax) relative to the first body along a second axis of the overlapping region of the first body, L being a horizontal length of the Hall sensor and M being a vertical length of the Hall sensor,
wherein the magnetic element comprises a minimum size (LXmax*LYmax) corresponding to the maximum horizontal moving distance and the maximum vertical moving distance of the second body,
wherein LXmax and LYmax are respectively obtained based on a total value of a straight line moving distance and a rotational moving distance of the second body, or based on L or M, and
wherein LXmax is determined by the following:
LXmax=Max (A, Xc, Xd)+L+B; A and B being a left and a right horizontal sliding distance of the second body; Xc and Xd being a horizontal sliding distance by a clockwise and an anticlockwise rotation of the second body; and Max (A, Xc, Xd) being a maximum value among A, Xc and Xd.

2. The device of claim 1, wherein LYmax is determined by the following:

$$LYmax=Yc+M+Yd,$$

wherein Yc denotes a vertical sliding distance by a clockwise rotation of the second body; and
Yd denotes a vertical sliding distance by an anticlockwise rotation of the second body.

3. The device of claim 1, wherein the horizontal sliding distance in a clockwise or anticlockwise rotation of the second body is determined by the following:

$$Xc=\sin(\theta/2)*(\sin(\theta/2)*R*2)$$

$$Xd=\sin(\theta'/2)*(\sin(\theta'/2)*R*2),$$

wherein $\theta$ denotes a clockwise rotation angle of the second body;
$\theta'$ denotes an anticlockwise rotation angle of the second body; and
R denotes a rotation radius of the second body.

4. The device of claim 1, wherein a distance of a vertical rotation sliding resulting from the clockwise or anticlockwise rotation of the second body is determined by the following:

$$Yc=\cos(\theta/2)*(\sin(\theta/2)*R*2)$$

$$Yd=\cos(\theta'/2)*(\sin(\theta'/2)*R*2),$$

wherein Y denotes the distance of a vertical rotation sliding of the second body;
$\theta$ denotes a clockwise rotation angle of the second body;
$\theta'$ denotes an anticlockwise rotation angle of the second body; and
R denotes a rotation radius of the second body.

5. The device of claim 1, wherein a minimum length and width of the magnetic element is larger than a length and width of the Hall sensor.

6. The device of claim 1, wherein the magnetic element has a rectangular shape.

7. The device of claim 1, wherein the magnetic element is arranged so that an area of the magnetic element is not overlapped by an opposed area of the Hall sensor.

8. A device, comprising:
a first body;
a Hall sensor arranged in the first body, the Hall sensor comprising a plurality of Hall elements disposed symmetrically and spaced apart from each other;
a second body configured to overlap the first body and having a maximum sliding area relative to the first body when overlapping the first body, the second body being configured to translate a maximum horizontal moving distance (LXmax) relative to the first body along a first axis of an overlapping region of the first body and a maximum vertical moving distance (LYmax) relative to the first body along a second axis of the overlapping region of the first body, wherein L is a horizontal length of the Hall sensor and M is a vertical length of the Hall sensor; and
a magnetic element arranged in the second body and having a size such that the magnetic element is sensed by the Hall sensor within substantially the entirety of the maximum sliding area,
wherein the magnetic element comprises a minimum size (LXmax*LYmax) corresponding to LXmax and LYmax,
wherein LXmax and LYmax are respectively obtained based on a total value of a straight line moving distance and a rotational moving distance of the second body, or based on L or M, and
wherein LXmax is determined by the following:
LXmax=Max (A, Xc, Xd)+L+B; A and B being a left and a right horizontal sliding distance of the second body; Xc and Xd being a horizontal sliding distance by a clockwise and an anticlockwise rotation of the second body; and Max (A, Xc, Xd) being a maximum value among A, Xc and Xd.

9. The device of claim 8, wherein
the device is a display terminal;
the Hall sensor is configured to sense a magnetic field; and
the second body is connected to the first body.

10. The device of claim 9, wherein the magnetic element covers an area of the Hall sensor in response to the display terminal being closed.

11. The device of claim 8, wherein a size of the magnetic element is larger than the maximum sliding area.

* * * * *